(12) United States Patent
Wunderer (10) Patent No.: US 8,952,317 B2
(45) Date of Patent: Feb. 10, 2015

(54) APPARATUS FOR THE ANALYSIS OF AN OBJECT, PREFERABLY OF A DOCUMENT OF VALUE, USING OPTICAL RADIATION

(75) Inventor: Bernd Wunderer, Naples, FL (US)

(73) Assignee: Giesecke & Devrient GmbH, Munich (DE)

( * ) Notice: Subject to any disclaimer, the term of this patent is extended or adjusted under 35 U.S.C. 154(b) by 288 days.

(21) Appl. No.: 13/514,718

(22) PCT Filed: Dec. 13, 2010

(86) PCT No.: PCT/EP2010/007581
§ 371 (c)(1),
(2), (4) Date: Jun. 8, 2012

(87) PCT Pub. No.: WO2011/082766
PCT Pub. Date: Jul. 14, 2011

(65) Prior Publication Data
US 2012/0248299 A1     Oct. 4, 2012

(30) Foreign Application Priority Data

Dec. 14, 2009    (DE) .......................... 10 2009 058 244

(51) Int. Cl.
*G02B 6/06*        (2006.01)
*F21V 8/00*        (2006.01)
(Continued)

(52) U.S. Cl.
CPC .............. *G02B 6/0011* (2013.01); *G02B 5/045* (2013.01); *G02B 6/0096* (2013.01); *G02B 5/10* (2013.01); *G02B 5/12* (2013.01); *G02B 6/0038* (2013.01); *G02B 17/004* (2013.01)
USPC ..................................... 250/227.2

(58) Field of Classification Search
CPC ....... G02B 6/122; G02B 6/125; G02B 6/4214
USPC .................... 250/227.2; 385/18, 47, 10, 104, 385/123–129, 146
See application file for complete search history.

(56) References Cited

U.S. PATENT DOCUMENTS

| 4,287,414 A | 9/1981 | Soo et al. |
| 4,906,070 A | 3/1990 | Cobb, Jr. |

(Continued)

FOREIGN PATENT DOCUMENTS

| DE | 4022020 A1 | 1/1992 |
| DE | 4338780 A1 | 5/1994 |

(Continued)

OTHER PUBLICATIONS

DE Search Report dated Nov. 7, 2010 for DE 10 2009 058 244.4.
(Continued)

*Primary Examiner* — Thanh Luu
*Assistant Examiner* — Renee D Chavez
(74) *Attorney, Agent, or Firm* — Workman Nydegger (57) ABSTRACT

A device for examining an object, preferably a document of value, by using optical radiation, having an optical waveguide which has an anisotropic retro-reflector section, which is formed along a surface curved in a plane of curvature and which reflects radiation components specularly in a first plane of incidence parallel to the plane of curvature but retro-reflects radiation components orthogonally with respect to the first plane of incidence, so that at least a proportion of the optical radiation falling in a glancing manner on the retro-reflector section is at least partly guided on the convex side of the surface by reflection on the retro-reflector section.

20 Claims, 5 Drawing Sheets

(51) Int. Cl.
  *G02B 5/04* (2006.01)
  *G02B 5/10* (2006.01)
  *G02B 5/12* (2006.01)
  *G02B 17/00* (2006.01)

(56) References Cited

U.S. PATENT DOCUMENTS

| | | | |
|---|---|---|---|
| 5,056,892 A | | 10/1991 | Cobb, Jr. |
| 5,189,553 A | * | 2/1993 | Smith .................. 359/530 |
| 5,280,333 A | | 1/1994 | Wunderer |
| 5,576,825 A | | 11/1996 | Nakajima et al. |
| 5,847,834 A | | 12/1998 | Ho et al. |
| 2006/0173574 A1 | | 8/2006 | Mosteller et al. |
| 2011/0081366 A1 | | 4/2011 | Krieg |

FOREIGN PATENT DOCUMENTS

| | | |
|---|---|---|
| DE | 4444658 A1 | 6/1996 |
| DE | 10055372 A1 | 8/2001 |
| WO | 2009144668 A1 | 12/2009 |

OTHER PUBLICATIONS

International Search Report dated Mar. 16, 2011 for PCT/EP2010/007581.

IPRP in PCT/EP1010/007581, Jul. 4, 2012.

* cited by examiner

APPARATUS FOR THE ANALYSIS OF AN OBJECT, PREFERABLY OF A DOCUMENT OF VALUE, USING OPTICAL RADIATION

BACKGROUND OF THE INVENTION

A. Field of the Invention

The present invention relates to an apparatus for the analysis of an object, preferably of a document of value, using optical radiation, in particular an apparatus for the illumination of an object and/or an apparatus for the capture of an image of a document of value.

B. Related Art

In this context, documents of value are understood to mean sheet-shaped objects, which represent for example a monetary value or an authorization and thus shall not be producible at will by unauthorized persons. Therefore, they have features not easy to manufacture, in particular to copy, whose presence is an indication of the authenticity, i.e. the manufacturing by a body authorized thereto. Examples of such documents of value are chip cards, coupons, vouchers, checks and in particular bank notes.

For analysing objects, in particular documents of value, there are frequently employed optical sensors which capture in locally resolved fashion optical properties of an object to be analysed and for this purpose illuminate with an illumination apparatus strip-shaped regions on the object at least partly with optical radiation and image them onto a substantially line-shaped field of receiving elements of an image capturing apparatus of the sensor. The receiving elements form, in dependence on the radiation falling thereon, receive signals which together represent an image of the respective region of the object. Through motion of the object transversely to the direction of the line or strip and through sequential capture of such images during the motion past the sensor, a two-dimensional image of the object can be captured or recorded. Optical radiation according to the invention is understood to be electromagnetic radiation in the infrared, visible or ultraviolet wavelength range. The components described in the following need not be configured for a use in the entire optical spectral range, rather, a configuration in one spectral range, specified for example by the nature of the object or the desired analysis, within the optical spectral range is sufficient.

SUMMARY OF THE INVENTION

In many applications it is desirable that the sensor can be of very compact and inexpensive construction. The optical resolution, on the other hand, need not always meet high demands. Sensors with conventional imaging systems which employ only lenses or mirrors do not always meet these demands to the desired extent upon line-by-line imaging. In the past, self-focusing light guides, so-called SELFOCs, have sometimes been used for this purpose, but their availability is decreasing. This applies in particular to those SELFOCs having back focal distances necessary for achieving necessary depths of sharpness. For a good detection of holes in a document of value or of mirroring reflective regions, for example reflective security features or adhesive tape, on a document of value, an illumination of the region to be imaged with a constant aperture defined over a region as large as possible is desirable; for this purpose in the past there have also been used SELFOCs. For achieving good images, a simple but good illumination of the region to be imaged is also desirable here.

The present invention is therefore based on the object to create an apparatus for the analysis of objects, preferably documents of value, using optical radiation, in particular for an optical sensor for the analysis of objects, in particular documents of value, which makes possible a simple and compact construction of an optical sensor of at least low optical resolution even without SELFOCs, and to provide an optical sensor with such an apparatus.

The object is achieved by an apparatus for the analysis of an object, preferably a document of value, using optical radiation, having a light guide which has an anisotropic retroreflector portion formed along an area curved in a plane of curvature, which retroreflector portion specularly reflects radiation components in a first plane of incidence parallel to the plane of curvature orthogonal to the axis, but retroreflects radiation components orthogonal to the first plane of incidence, so that optical radiation grazingly falling on the retroreflector portion is at least partly guidable at the convex side of the area by reflection at the retroreflector portion and in particular at least a proportion of the optical radiation grazingly falling on the retroreflector portion is at least partly guided and preferably held together at the convex side of the area by reflection at the retroreflector portion.

Radiation grazingly falling on the retroreflector portion is understood here to be radiation which falls on the retroreflector portion in a specified range of angles to the plane of curvature, so that a specular reflection, in particular with a great angle of incidence, can be effected in the first plane of incidence; because of the curvature this specular reflection can optionally be effected in multiple fashion and thus cause a guiding in the first plane of incidence along the retroreflector portion.

The area curved in the plane of curvature is understood to be an area which has a curvature in the plane of curvature, i.e. whose orthogonal projection onto the plane of curvature results in a curved curve in the plane of curvature; in a direction orthogonal to the plane of curvature, however, is has preferably no curvature. This means that the area curved in the plane of curvature is preferably an area whose curvature lies only in the plane of curvature or planes parallel thereto or which is curved only along the plane of curvature. That the retroreflector portion extends along the area curved in the plane of curvature, is understood to mean that the retroreflector portion has along the curved area optically effective, preferably equally configured anisotropically reflective structures which cause the anisotropic reflection behavior. The guiding of the optical radiation is effected at the convex side of the curved area. Specular reflection in the first plane of incidence is understood within the framework of the invention to mean that a ray in the first plane of incidence and enclosing a given angle of incidence with a normal to the plane of the retroreflector portion is deflected by the retroreflector portion in a new direction, given by an angle of emergence relative to the normal to the plane of the retroreflector portion. The angles of incidence and emergence are then equal as usual.

The terms "retroreflect" and "retroreflection" are understood within the framework of the invention to mean, in contrast, that an incident ray in a second plane of incidence, which extends orthogonally to the first plane of incidence and tangentially to the curved area, and the retroreflected ray resulting from the retroreflection of the incident ray extend parallel, whereby a certain mutual offset of the rays in a direction parallel to the second plane of incidence of the retroreflector portion may occur. Since the retroreflector portion extends along the area curved in the plane of curvature, for each point of impact of a ray onto the retroreflector portion there is a second plane of incidence which extends orthogonally to the first plane of incidence. This means that incident rays are retroreflected by the retroreflector portion in a direction orthogonal to the first plane of incidence.

Depending on the type of the retroreflector portion, however, this behavior only occurs in a certain range of angles of incidence. Unless otherwise stated, it will be assumed within the framework of the invention that the incident rays are in an angular range where the retroreflection is possible at least in good approximation.

An anisotropic retroreflector portion according to the invention can have for example a body with a surface curved in the plane of curvature, for example a bent or curved plate, of a transparent material, on or in the surface of which, as a curved area, there is formed, as anisotropically reflective structures, a field of prisms extending in the first plane of incidence parallel to a curve curved in accordance with the curvature of the area, preferably roof prisms with a prism angle of 90°. The prisms provide the retroreflection in the second plane of incidence in a per se known manner, whereby the reflection can be given at the boundary areas of the prisms by total reflection or reflection at a mirroring layer on the surface of the prisms.

Compared to a simple mirror, an anisotropic retroreflector portion according to the invention thus shows an unusual behavior, for the description of which the following can be imagined: When a ray falls on the anisotropic retroreflector portion from a specified direction, the reflected ray results from the incident ray or incident radiation being decomposable into first and second directional components which lie in the first or the second plane of incidence and the vectorial sum thereof represents the direction of the incident ray or incident radiation. The first directional component is specularly reflected, but the second directional component is retroreflected, and the two reflected directional components are vectorially summed up again or superimposed. In the first plane there is effected a specular reflection, whereby a retroreflection in the second plane takes place simultaneously. It is assumed here that the direction of the incident ray is so specified that a retroreflection can take place at all. In the case of the stated roof prisms as the retroreflective structure, the direction of the incident ray can for this purpose be such that the angle of incidence of the component in the second plane of incidence is smaller than 45°.

Rays grazingly incident on the retroreflector portion on the convex side thereof are therefore reflected as follows. Directional or radiation components of such rays in the first plane of incidence, in particular directional components grazingly falling on the retroreflector portion or the curved area in the first plane of incidence, are specularly reflected, so that they are not deflected orthogonally to the first plane of incidence and are guided by single or multiple specular reflection at the retroreflector portion. An arbitrary divergence of these directional components is prevented by the curvature of the area, so that a certain concentration or focussing of these directional components occurs during the guiding at the retroreflector portion, which, however, is not perfect. The directional or radiation components orthogonal to the first plane of incidence or in the second planes of incidence, on the other hand, are retroreflected, so that through the retroreflection there occurs a certain concentration or focussing in a direction orthogonal to the first plane of incidence. Altogether, therefrom results a concentration of the rays or the optical radiation guided at the retroreflector portion, which leads to an imaging with limited resolution.

The light guide can be configured in different ways. It can be configured as a hollow light guide or as a light guide of a transparent material. Further, the light guide may lie on the concave side of the curved area, so that the optical radiation is guided at its outer side. But, preferably, the optical radiation is guided in the light guide. This then preferably has a strip-shaped entrance area, through which the optical radiation can be coupled into the light guide, so that this optical radiation is guided at least partly in the light guide at the convex side of the area by reflection at the retroreflector portion, and has an exit area through which the optical radiation coupled through the entrance area into the light guide and guided therein exits from the light guide. In particular, the light guide can have, besides the retroreflector portion located on the outer area, an inner area with greater curvature, preferably extending parallel thereto.

This has the advantage that rays entering through a point or small region of the entrance area into the light guide, depending on the configuration of the light guide and entrance angle relative to the curved area as well as to the entrance point in the entrance area, optionally, after reflection at a surface or inner area of the light guide, which is located at the convex side of the curved surface, coming from the light guide can fall on the retroreflector portion at the outer side of the light guide, so that a collecting function can be achieved. Altogether, therefrom results a concentration of the optical radiation exiting through the exit area, which leads to an imaging with limited resolution.

The use of such apparatuses which have a very simple construction and, due to the avoidance of lenses or imaging mirrors, can be designed to be very small makes possible a very compact and simple construction of an imaging system and of an optical sensor having such a system.

An apparatus for the analysis of an object with optical radiation is here generally understood to be an apparatus which can be used for the stated purpose, in particular for the illumination of the object or for the imaging of an illuminated region. In principle, the apparatus only needs to be configured for illuminating or for capturing an image of at least one region of the object.

According to a first embodiment, the apparatus can therefore have a source for emitting the optical radiation in a specified spectral range, whose optical radiation at least partly falls grazingly on the retroreflector portion or is preferably coupled through the entrance area into the light guide and is guided thereby. Such an apparatus, which in the following is also referred to as illumination apparatus, can in particular be employed as a very simply constructed illumination apparatus, which serves for illuminating the object to be analysed, preferably document of value. The use of the apparatus can offer a special advantage when the employed radiation is to illuminate the object at all locations with the same aperture.

Particularly preferably, the source can be configured for emitting the optical radiation in a ray bundle with a strip-shaped cross section at the entrance area, whereby the longitudinal direction of the cross section, i.e. the direction parallel to the strip, extends orthogonally to the first plane of incidence. This offers the advantage that a very large part of the radiation emitted by the source can actually be coupled into the light guide and after guidance by the light guide and exit through the exit area be used for illumination.

In a second embodiment, the apparatus can preferably have a receiving device for the capture of the optical radiation guided by the light guide and preferably exiting from the exit area, preferably as an image. Particularly preferably, the image can be line-shaped. The corresponding radiation falling on the retroreflector portion from the capture region represents the radiation employed for the analysis. This embodiment of the apparatus, in the following also referred to as image capturing apparatus, can be advantageously employed as a receiving or detection apparatus of an imaging optical sensor. Its capture region is here given by the fact that at least a part of the optical radiation coming therefrom can be captured by the apparatus.

Particularly preferably, the receiving device for capturing the guided radiation in a locally resolved fashion, preferably the optical radiation exiting from the exit area, can be formed along at least one line, preferably a straight line, particularly preferably close behind the exit area. Preferably, the line extends parallel to the longitudinal direction of a cross section of the ray bundle at the receiving device, which has exited from the exit area. This is advantageous in particular when the entrance and/or the exit area are formed in strip-shaped fashion, so that their largest extent or longitudinal direction extends orthogonally to the first plane of incidence. So, the apparatus can be employed for example as the optical part of a line-scan camera, which images the optical radiation, which corresponds to a line, coming from a capture region or a document of value in the capture region and entering through the strip-shaped entrance area, through the exit area onto the receiving device.

The preferred embodiments described in the following are of advantage in particular for the above-described first and second embodiments of the apparatus, according to which the apparatus can be configured as an illumination apparatus or as an image capturing apparatus.

The retroreflector portion can be configured in any fashion except for the above-described features. In particular, it is not necessary that the curved area and thus the retroreflector portion has a constant radius of curvature. However, it is preferred that the curved area has the form of a sector of a circular cylinder, which preferably has a sector angle greater than 30°, particularly preferred greater than 80°. The sector angle here is understood to be that angle which is enclosed by straight lines in the plane of curvature through the axis of the circular cylinder extending orthogonally to the plane of curvature and through respectively one of the endpoints of the projection of the curved area onto the plane of curvature. Angles of 90° or 180° are particularly preferred.

In principle, the curvature of the curved area or the curvature of the projection of the area onto the first plane of incidence can be chosen arbitrarily, as long as at least one reflection occurs at the retroreflector portion. But preferably, the curved area has in the first plane of incidence, i.e. an orthogonal projection of the curved area onto the first plane of incidence, a radius of curvature between 10 mm and 100 mm. Therefrom results, preferably upon a circular cylindrical form and sector angles greater than 80°, a good concentration by the light guide.

The light guide can have in principle any desired form, as long as it has the retroreflector portion. But preferably, the light guide, has the form of a plate curved in the plane of curvature, preferably of constant thickness. The thickness is here the thickness of the plate in the first plane of incidence. It preferably lies in the range between 0.5 mm and 3 mm. The retroreflector portion can then extend in particular along the curved outer area of the plate. The outer area here is understood to be the curved outer area of the plate, on the convex side of which is located the light guide or which has the smaller curvature, in the case of a circular cylinder thus a greater radius of curvature. Particularly preferably, the height of the plate, i.e. the extent of the plate orthogonal to the first plane of incidence is greater by at least the factor of two, preferably five, than the thickness.

The light guide can in principle be formed of any materials transparent to the employed optical radiation. For example, it can be manufactured of a suitable glass. Preferably, however, it is formed of a transparent plastic material. Preferably, the material of the light guide is chosen such that the specular reflection as well as the retroreflection is effected by total reflection. However, alternatively or additionally, also a mirror coating, for example by means of a suitable coating, is conceivable.

The retroreflector portion can be formed in different ways. In particular, a corresponding structure can be produced by milling or embossing or injection-molding.

A particularly simple manufacturing of the light guide arises with the following method which is also the subject matter of the invention: A plane plate of thermoplastic, transparent material, whose one area already has the retroreflector portion, is cut into strips which have two mutually opposing edges or face areas which extend orthogonally to the first plane of incidence and for forming the entrance and exit areas are preferably polished. These strips, after heating, are bent such that there arises the curved form with a curvature in a plane of curvature parallel to the first plane of incidence. After the cool-down, the light guide can be used or further processed.

In principle, it is sufficient that the reflection is effected only at the retroreflector portion which extends along the curved area which can form in particular the outer area of the light guide.

However, it is also possible that the light guide is configured to be reflective for the optical radiation, in particular in the specified spectral range, along an inner area which opposes the curved area and is located on the convex side of the curved area, preferably extending parallel thereto. This makes it possible for radiation of a particularly great angular range to be coupled into the light guide and guided therein, which is advantageous both upon a configuration as an illumination apparatus and as a receiving apparatus.

The light guide, however, can also have an inner anisotropic retroreflector portion along an inner area which opposes the curved area and is located on the convex side of the curved area, preferably extending parallel thereto, which retroreflector portion specularly reflects radiation components in a first plane of incidence which is parallel to the plane of curvature and orthogonal to the axis, but retroreflects radiation components orthogonal to the first plane of incidence, so that the optical radiation is guidable at least partly between the retroreflector portions. This formation of the inner area also as a retroreflector portion, has the advantage that an improved concentration is made possible in particular upon large curvatures or strongly divergent ray bundles at the entrance area. The guiding of the optical radiation is effected analogous to the one effected by the first retroreflector portion. Comparatively strongly divergent ray bundles can thus also be guided and again be concentrated.

If the light guide is not a hollow light guide and has an entrance area and the exit area, these can in principle be formed and aligned in any fashion. According to a preferred embodiment, the entrance and/or exit area can be configured as planar areas. These planar areas can be arranged in particular orthogonally to the plane of curvature and the second plane of incidence of the retroreflector portion at the entrance or exit area. Thus, a deflection of the rays extending parallel to the plane of curvature is avoided. According to a different preferred embodiment, the entrance and/or exit area is inclined orthogonally to the plane of curvature and in a specified angle relative to the second plane of incidence at the entrance and/or exit area. It can thus be achieved that the ray path is bent at the entrance or exit area.

According to a further preferred embodiment, the entrance and/or the exit areas can be formed bulged in such fashion that they act as lenses. Thus, a magnification or demagnification effect can be achieved. The bulge can here preferably be circular cylindrical (with the cylindrical axis orthogonal to the first plane of incidence or the plane of curvature) or aspheric-cylindrical.

The light guide can also have a further anisotropic retroreflector portion which is formed along a further area curved in the plane of curvature and which specularly reflects radiation components in a first plane of incidence parallel to the plane of curvature, but retroreflects radiation components orthogonal to the plane of curvature, so that the coupled-in optical radiation is guided along an S-shaped area. The further curved area here continues the inner area which opposes the first curved area which is closer to entrance area, preferably is adjacent thereto. Thus, it is located again on the outer side of the light guide which is located on the convex side of the outer area. This allows an offset in the ray path, which otherwise could only be achieved with an optical system which demands considerable space.

The apparatuses according to the invention are suitable in particular for the construction of optical sensors. The object of the present invention is therefore also an optical sensor for the capture of optical properties of an object, preferably document of value, in a specified capture region, which has an apparatus according to the invention configured as a receiving apparatus, and in which optical radiation coming from the capture region, in particular from an object, preferably document of value, in the capture region, is guided at the retroreflector portion, whereby it is coupled, depending on the configuration of the light guide, preferably into the entrance area of the light guide. In principle, it is not necessary that the sensor has a special illumination apparatus when an illumination of the object or document of value with optical ambient radiation, in particular visible light is sufficient. Preferably, however, the optical sensor has an illumination device which is configured to emit optical radiation in a specified spectral range onto the capture region or an object or a document of value in the capture region.

In principle, the illumination apparatus can be configured in any desired fashion. Preferably, however, the optical sensor has an illumination apparatus according to the invention, as it is described above, whereby the optical radiation guided by the retroreflector portion of the apparatus for illumination and, depending on the configuration of the light guide, preferably exiting from the exit area of the light guide of the apparatus for illumination or illumination apparatus, illuminates the capture region. This embodiment allows an especially compact construction. Particularly preferably, the light guide can be configured and arranged such that the optical radiation is emitted with an aperture constant in more than two thirds of the capture region, preferably the entire capture region.

Further object of the invention is an optical sensor for capturing optical properties of an object, preferably of a document of value in a specified capture region, with an apparatus for illumination according to the invention, as it is described above, whose optical radiation guided by the retroreflector portion of the apparatus for illumination and, depending on the configuration of the light guide, preferably exiting from the exit area of the light guide, illuminates the capture region, and with a receiving device which is configured to capture optical radiation coming from the capture region and to form signals describing the properties of the captured radiation. The receiving device in this case does not necessarily have to be configured as an apparatus for capture according to the invention.

The described optical sensors which have both an illumination and a receiving device, can be configured in particular for the capture of luminescence, remission and/or transmission properties of documents of value.

In the case of the luminescence and remission properties, the illumination and the capture apparatus or their exit and entrance areas are arranged on the same side of the capture region, so that optical radiation emitted by the illumination apparatus can be remitted by the document of value and the remitted radiation can be captured by the capture apparatus; in the second case the illumination and capture apparatus or their exit or entrance areas are arranged on mutually opposing sides of the capture region or of a document of value arranged therein.

Upon the capture of luminescence properties, the illumination radiation can lie in a different spectral range than the luminescence radiation finally captured by the receiving device.

DESCRIPTION OF THE DRAWINGS

In the following the invention is still further explained by way of example with reference to the Figures. There are shown.

DETAILED DESCRIPTION OF PREFERRED EMBODIMENTS OF THE INVENTION

Figure 1:
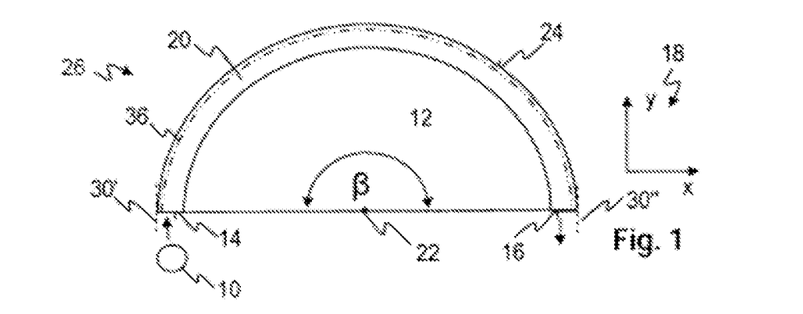
FIG. 1 a schematic view of a light guide with an anisotropic retroreflector portion extending along a curved area, from a direction orthogonal to a plane of curvature of the light guide, FIG. 2 a schematic view of a cross section of the light guide in FIG. 1, FIG. 3 a schematic perspective view of a short portion of the light guide in FIG. 1 for illustrating the reflection at the retroreflector portion, FIG. 4 a schematic representation of the specular reflection of a ray at a light guide's outer area along which the retroreflector portion is arranged, in a first plane of incidence of the retroreflector portion parallel to the plane of curvature, FIG. 5 a schematic representation for comparing the specular with the retroreflection of the marginal rays of a ray bundle by the retroreflector portion, in which the rays are projected onto a plane extending through an axis of curvature by which the outer side of the light guide is curved, FIG. 6 a schematic representation of an apparatus for processing documents of value, FIG. 7 a schematic representation of an optical sensor of the processing apparatus in FIG. 6 from the side, which is configured to capture remission properties of a document of value, FIG. 8 a schematic representation of a receiving device of the sensor in FIG. 7, FIG. 9 a schematic representation of a further optical sensor from the side, which is configured to capture transmission properties of a document of value, FIG. 10 a schematic view of an apparatus for the analysis of a document of value using optical radiation, in which there is effected an offset of the emitted radiation compared to the coupled-in radiation, FIG. 11 a schematic view of a further apparatus for the analysis of a document of value using optical radiation, in which there is effected an offset of the radiation exiting from a light guide of the apparatus compared to the radiation coupled into the light guide, FIG. 12 a schematic view of a further apparatus for the analysis of a document of value using optical radiation, in which a curvature of the light guide is not circular, FIG. 13 a schematic view of a light guide at an entrance area which is curved or bulged, FIG. 14 a schematic view of a cross section of a further light guide of an apparatus for the analysis of documents of value, and FIG. 15 a schematic view of a light guide configured as a hollow light guide with an anisotropic retroreflector portion extending along a curved area and a reflective inner area, which light guide guides optical radiation in a hollow cavity, from a direction orthogonal to a plane of curvature of the light guide.

An apparatus for the analysis of an object, in the example of a document of value, in the form of an illumination apparatus in FIG. 1, has a source 10 for optical radiation, in the example visible light, and a light guide 12 with an entrance area 14 through which optical radiation of the source 10 is coupled into the light guide and an exit area 16 through which the optical radiation, which has been coupled into the light guide through the entrance area 14, can be coupled out or can exit from the light guide 12.

Figure 2:
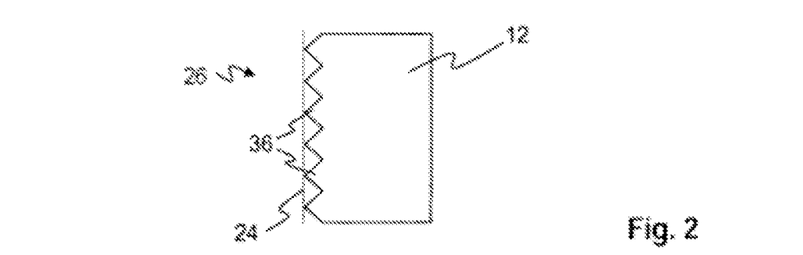

The light guide 12, whose cross section is shown schematically in FIG. 2, is formed by an originally plane-parallel plate 20 which is curved in a plane of curvature 18 of the x-y-plane, but is not curved in the direction z orthogonal to the plane of curvature 18. In the example, the plate 20 has a constant thickness and has the form of a circular cylinder segment with a sector angle β and a cylindrical axis or axis of curvature 22. In the example, the sector angle is 180°, the axis of curvature is orthogonal to the plane of curvature 18. The light guide 12 therefore has an area 24 curved in the plane of curvature 18, namely the outer area, on the convex side of which there is located the plate or the inside of the light guide 12. This outer area accordingly has the form of a sector of a circular cylinder, which has a sector angle β which is greater than 30°, particularly preferably greater than 80°, in the example 180°. Due to the circular cylindrical form, the curved area has one single axis of curvature, namely the cylindrical axis or axis of curvature 22.

Along the curved outer area 24 there is formed an anisotropic retroreflector portion 26 of the light guide 12, which specularly reflects radiation components in a first plane of incident 28 parallel to the plane of curvature 18 and retroreflects radiation components in a second plane of incidence 30 extending orthogonally to the plane of curvature 18 or the first plane of incidence 28 and tangentially to the curved outer area 24. By the second plane of incidence respectively extending tangentially to the curved outer area 24, there occurs a change of the direction of the second planes of incidence along the light guide 12. In FIG. 1 there are shown second planes of incidence 30' and 30" at the entrance and exit area 14 and 16.

Figure 3:
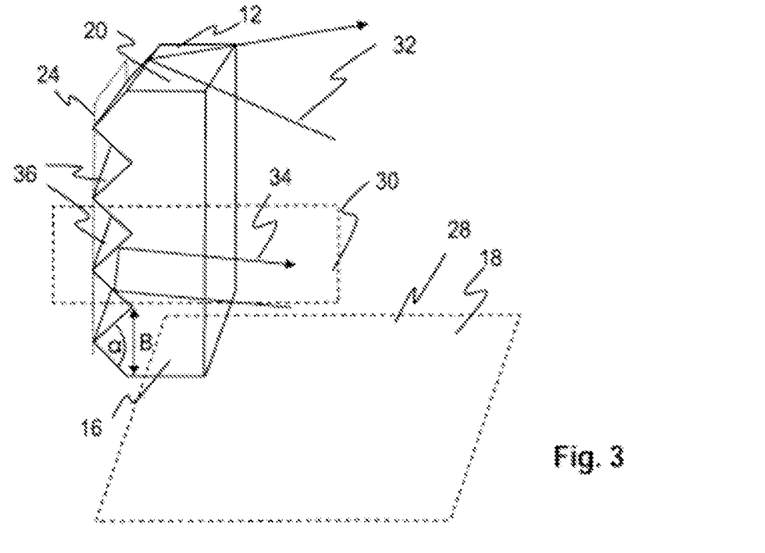
Figure 4:
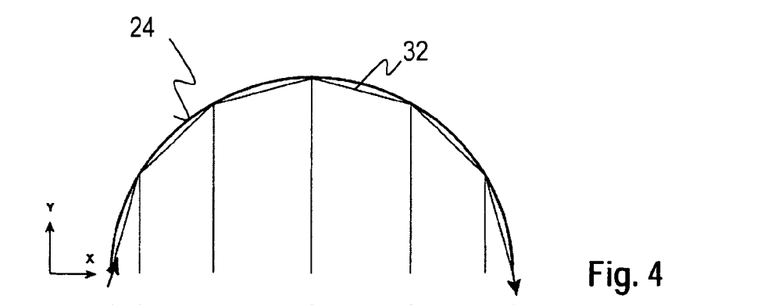
Figure 5:
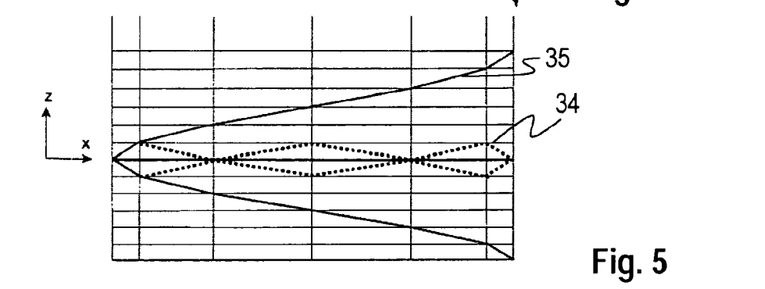

At the anisotropic retroreflector portion 26 the radiation components 32 in the first plane of incidence 28 are specularly reflected; radiation components 34 in the second plane of incidence 30, however, are retroreflected thereby, i.e. thrown back in the same direction from which they come, or parallel to the direction from which they come (see FIGS. 3 to 5). Representing the direction of propagation of the radiation locally as a vector, this means that the radiation is representable as the superimposition of two vector components in the first and second planes of incidence. The radiation thrown back by the retroreflector portion 26 is then propagated in a direction given by components in the two planes of incidence. The component in the first plane of incidence corresponds to specular reflection, while the component in the second planes of incidence corresponds to retroreflection.

The retroreflector portion 26 comprises as the anisotropically reflective structure, in the present example, elongate symmetric prisms 36, more precisely, roof prisms with a prism angle of 90°, arranged equidistantly and extending mutually parallel and parallel to straight lines in the first plane of incidence 28, which prisms are formed in the curved outer area 24 of the light guide 12, in the example the plate 20. Since the retroreflector portion 26 is formed along the curved outer area, mutually corresponding edges of the prisms 36 respectively lie in areas extending parallel to the outer area 24. FIG. 2 shows a schematic representation of a cross section of the light guide in radial direction, whereby, however, for clarity's sake the proportions are not shown true to scale and in particular the number of prisms is substantially smaller than in the corresponding real light guide. The cross sections of the prisms 36 orthogonally to their longitudinal extension, i.e. in the second plane of incidence 30, have, in the example, the form of an isosceles triangle with a vertical angle α of 90° and a base width B of about 300 μm. The refractive index of the material of the prisms is chosen such that the retroreflection is effected by double total reflection at the flanks of the prisms. The retroreflection preferably occurs here over a whole range of angles of incidence onto the plane of the retroreflector portion 26 or the prism assembly. Due to the curvature of the outer area 24 there is for each radial cross section through the light guide 12 a second plane of incidence orthogonally to the first plane of incidence.

The reflection of the radiation components 32 or 34 in the first plane of incidence 28 or the second planes of incidence 30 along the light guide 12 is once again illustrated in the FIGS. 4 and 5. Radiation components 32 (see FIG. 4) lying in the first plane of incidence of the rays coupled in through the entrance area 14, which radiation components grazingly fall on the outer area 24 or the retroreflector portion 26, are in general multiply specularly reflected and due to the curvature of the light guide 12 guided along the outer area 24 thereof until they exit from the exit area 16.

Radiation components 34 lying in second planes of incidence 30 orthogonally to the first plane of incidence 28 of rays coupled in through the entrance area 14, however, are retroreflected at the retroreflector portion 26 and thus concentrated to a certain degree. This is illustrated in FIG. 5, in which the radiation components 34 are represented by dotted lines in a projection onto a plane extending perpendicular to the first plane of incidence and through the first axis 22. Without such a retroreflection a radiation component 35 in the second plane of incidence would not be directed back at the entrance area 14, a ray bundle would diverge in this direction. This is illustrated in FIG. 5 by the unbroken lines 35.

The entrance and exit areas 14 and 16 are respectively configured as planar areas which extend orthogonally to the plane of curvature 18 and to the second planes of incidence 30' and 30" of the retroreflector portion 26 at the entrance and/or exit area 14 and 16.

The area opposing the outer area 24, i.e. the inner area, is formed in specularly reflective fashion.

The light guide 12 therefore forms an imaging optical system, which provides 1:1 imaging, which, however, does not have a very high resolution. So, upon a radius of curvature of 10 mm, a thickness of 2 mm and a structure width of 300 μm, the resolution may be in the order of magnitude of 1 mm.

The source 10 is configured as a line- and/or strip-shaped illumination, which extends with its longitudinal direction parallel to the strip-shaped entrance area 14. The light guide 12 thus deflects the optical radiation of the source 10 entering into the light guide and provides a concentration of the optical radiation, so that a specified region can be illuminated with the radiation. Due to the imaging properties, each dot of the source is imaged in a blurred fashion in a dot on the object to be illuminated.

As explained in the following example, an image capturing apparatus with such a light guide and a downstream receiving device for the optical radiation exiting from the exit area works analogously. The light guide images a subject or an object upon suitable arrangement of the receiving device onto this receiving device, so that it can capture an image of the subject or object. If the receiving device offers in the z direction a capture of optical radiation in locally resolved fashion, such a strip-shaped capture region can be imaged in locally resolved fashion onto the receiving device which emits signals which represent a line image. Through the use of planar entrance and exit areas, there is achieved 1:1 imaging along to the line, and transversely thereto at least approximately.

Figure 6:
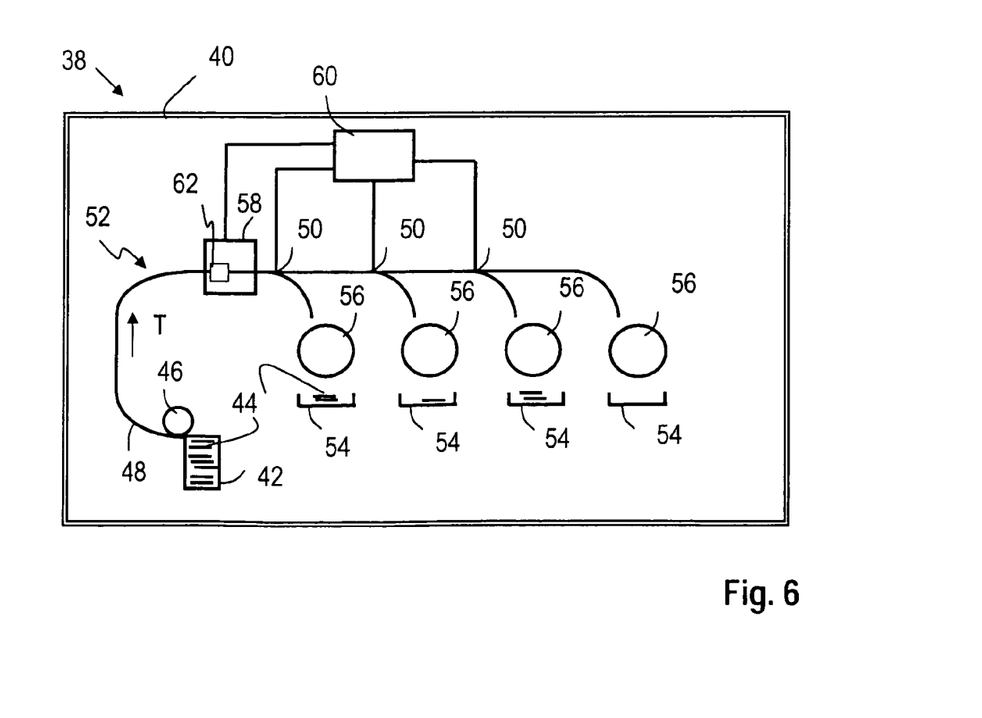
Figures 7, 8:
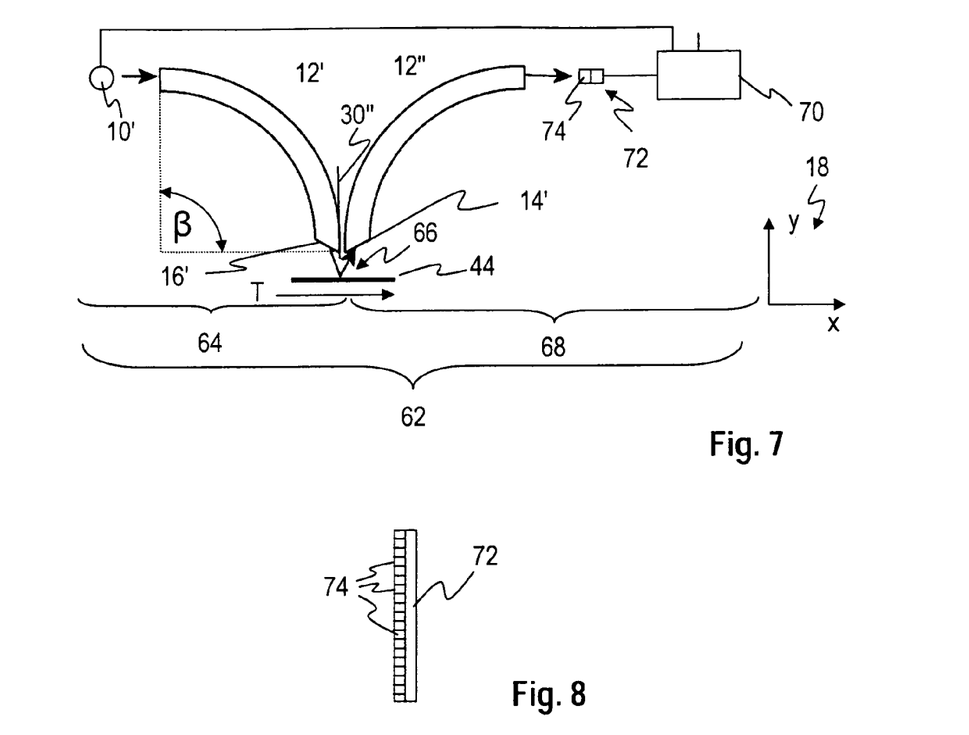

A possible use of such apparatuses for the analysis of a document of value, using optical radiation, and in particular for an optical sensor which works in an apparatus for processing documents of value, is illustrated in the FIGS. 6 to 8.

An apparatus for processing documents of value 38 in FIG. 6, in the example a bank note processing apparatus, has in a housing 40 an input pocket 42 for inputting documents of value 44, in the example bank notes, to be processed, a singler 46 which can access documents of value 44 in the input pocket 42 and single them, a transport device 48 for transporting the singled documents of value, with gates 50, and, in branches of a transport path 58 given by the transport device 48, after the gates 50 in the transport direction, respectively output pockets 54 for taking up documents of value processed by means of the apparatus for processing documents of value 38. Before the output pockets 54 there are arranged stacking wheels 56. Further, the apparatus for processing documents of value 38 possesses, along the transport path 52 given by the transport device 48, a sensor assembly 58 arranged before the gates 50 for capturing properties of documents of value 44 transported along the transport path 52, and a machine control device 60 which is connected via signal connections at least to the sensor assembly 58 and the gates 50 and is configured for evaluating sensor signals from the sensor assembly 58 that represent at least one property of a document of value 44 captured by the sensor assembly 58, and controlling at least one of the gates 50 in dependence on the result of the evaluation of the sensor signals.

The sensor assembly 58 comprises in this embodiment a sensor 62 for capturing optical properties of the documents of value, in the example of a color image of the documents of value, for example for checking as to soiling, and/or for ascertaining the nominal value of the documents of value and/or for ascertaining the authenticity of the documents of value according to specified criteria. The sensor assembly can further comprise for example a sensor, not shown in FIG. 6, for capturing the state of documents of value, for example the presence of adhesive tape.

The machine control device 60 captures the signals of the sensor assembly 58 and ascertains whether the document of value captured by the sensor assembly 58 is in a fit state, i.e. suitable for further use as a means of payment, according to at least one specified criterion for soiling, or what nominal value it has, or whether it is authentic. In dependence on the result of the check, the machine control device 60 controls at least one of the gates 50 such that the document of value 44 is conveyed by the transport device 48 into an output pocket 54 associated with the check result or corresponding to a certain specified type, in particular nominal value, of documents of value, and deposited there.

The sensor 62 serving for ascertaining the color image of the document of value is shown very schematically in FIGS. 7 and 8. The sensor 62 is designed for line-by-line capture of a color image of the document of value during transport past the sensor 62. The lines extend transversely to the transport direction T. The sensor 62 has an illumination apparatus 64 for illuminating a capture region 66 or a document of value 44 in the capture region 66 with optical radiation, in the example with visible light, preferably in addition also infrared radiation, and an image capturing apparatus 68 for capturing a line-shaped image of at least a part of the illuminated region on the document of value 44. For controlling the illumination apparatus 64 and for precessing and evaluating the signals of the image capturing apparatus 68 there serves a sensor control and evaluation device 70 connected with the apparatuses 64 and 68 via signal connections, which, after evaluation, emits via the signal connection to the machine control device 60 signals that represent the result of the evaluation.

The illumination apparatus 64 has, like the illumination apparatus of the first embodiment, a source 10' for optical radiation and a light guide 12' into which the optical radiation of the source 10' is coupled. The source 10' is configured, depending on the control by the sensor control and evaluation device 70, for emitting, as the optical radiation, light of a specified color, in the example, red, green or blue. For this purpose, there can be provided for example corresponding light-emitting or laser diodes, whose light is formed via a homogenizing light guide to a ray bundle with strip-shaped cross section. Alternatively, a strip- or line-shaped arrangement of the light-emitting or laser diodes is also conceivable. The sensor control and evaluation device 70 controls the source 10' such that this emits light of respectively one of the three different colors, cyclically one after the other.

The light guide 12' is configured like the first light guide 12, except for two differences. The light guide 12' does not extend over a sector angle β of 180°, but only over a sector angle β of 90°, on the one hand. The exit area 16' is planar like the exit area 16, but forms with the second plane of incidence 30" at the sectional line between the curved outer area 24' of the light guide 12' and the exit area 16' an acute angle, in the example of 30°, on the other hand. The result is that the light coupled out of the exit area is refracted at the exit area 16' in the direction of the outer area 16' and therefore impinges beside the light guide 12' onto the capture region 66 or a document of value therein and illuminates this region or document.

Like in the first embodiment, the source 10' and the entrance area 14' of the light guide 12' are arranged such that the longitudinal direction, i.e. the direction parallel to the direction of the strip or of the largest extension of the cross section, of the ray bundle emitted by the source 10', extends parallel to the longitudinal direction or the second plane of incidence 30; i.e. the longitudinal directions of source and entrance area coincide.

The image capturing apparatus 68 has a light guide 12", which is configured in mirror-image form to the light guide 12', and a receiving device 72 for receiving in locally resolved fashion the optical radiation coupled out of the light guide 12' and for forming signals which represent the intensity of the optical radiation coupled out. A portion of the sensor control and evaluation device 70 is connected via a signal connection to the receiving device 72 and captures and processes the signals.

The receiving device 72 has several receiving elements, for example photodetection elements, arranged along a line such as schematically illustrated in FIG. 8. The line is arranged perpendicular to the first plane of incidence and parallel to the longitudinal direction of the strip-shaped exit area 16" of the light guide 12".

The light guides 12' and 12" are arranged in mirror-image form to each other such that a strip in the capture region 66 illuminated by the illumination apparatus 64 is imaged in locally resolved fashion onto the receiving device by the light guide 12". The local resolution is made possible by the retroreflection in the light guide 12" having a ray-concentrating effect. The inclination of the entrance area 14', which corresponds in mirror-image form to the inclination of the exit area 16', makes possible here an imaging of the capture region between the two light guides 12' and 12", which with their first planes of incidence and thus the longitudinal directions of the exit and/or entrance areas 16' and/or 14' are aligned parallel to each other.

The sensor control and evaluation device 70 captures the signals of the receiving elements 74 or of the receiving device in the cycle of the cyclical illumination, so that the sensor control and evaluation device 70 cyclically captures red, blue and green line images, from which it forms, after the document of value has been transported past, a color image of the document of value.

Figure 9:
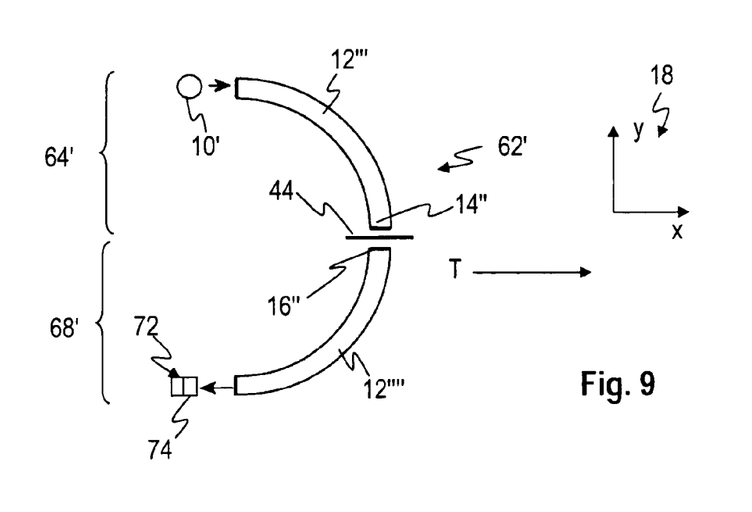

A further embodiment in FIG. 9 differs from the preceding embodiment in that the optical sensor 62' is configured, in contrast to the sensor 62, as a transmission sensor. It has an illumination apparatus 64' and an image capturing device 68', which are configured like the illumination apparatus 64 and the image capturing apparatus 68. Therefore, for the same components or parts the same reference signs are used and the explanations thereto apply accordingly. In FIG. 9, for clarity's sake, the sensor control and evaluation device 70 is not shown. The only difference compared to the illumination and/or image capturing apparatus 64 and/or 68, is that the entrance and exit areas are configured like in the first embodiment. The illumination apparatus 64' and the image capturing apparatus 68' are arranged relative to each other such that the exit area 16" of the light guide 12''' of the illumination apparatus 64' and the entrance area 14" of the light guide 12'''' of the image capturing apparatus 68' oppose each other, whereby the transport path for documents of value extends therebetween.

Accordingly, the sensor does not capture remission images but transmission images.

Further embodiments differ from the two embodiments described last in that the light guides of the illumination and of the image capturing device have different radii of curvature.

Figure 10:
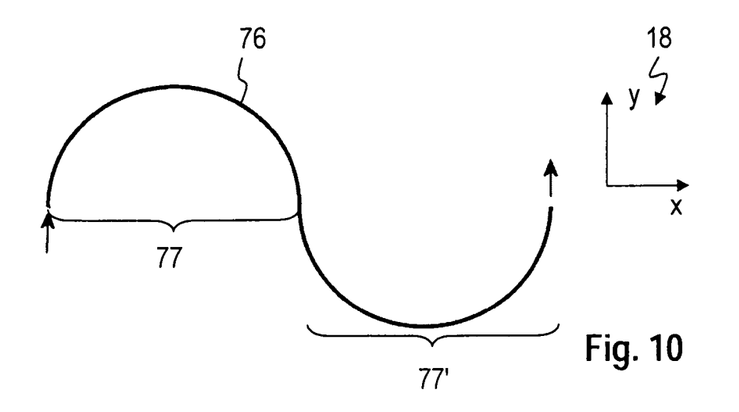
Figure 11:
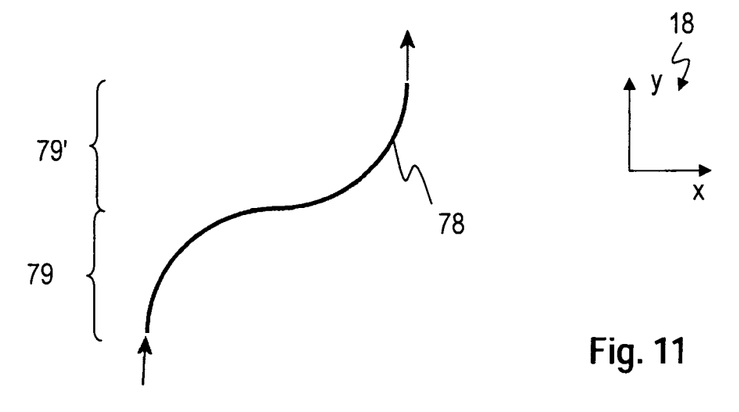

Further embodiments of illumination and/or image capturing apparatuses differ from the illumination and/or image capturing apparatus in FIG. 8 in the use of differently formed light guides, in particular light guides curved in S-form. In the examples of FIGS. 10 and 11, for simplicity's sake, there is shown only the light guide.

In the example of FIG. 10, the light guide 76 comprises two adjacent segments 77 and 77' which are configured like the light guide 12 in the first embodiment and respectively have the form of a sector of a circular cylinder with a sector angle of 180°. Such light guides allow 1:1 imaging, upon which object and image are mutually offset four times the radius of the circular cylinder in the x direction in the first plane of incidence, and whereby in the y direction there occurs approximately no offset.

In a different example in FIG. 11, the light guide 78 comprises two adjacent segments 79 and 79', which are configured like the light guide 12 in the first embodiment, however, with the form of a sector of a circular cylinder with a sector angle of 90°. Such light guides allow 1:1 imaging, upon which object and image are mutually offset two times the radius of the circular cylinder in the x direction in the first plane of incidence and approximately also in the y direction.

The imaging with light guides curved in S-form has the further advantage that the imaging in the x direction remains symmetrical, although it mainly extends at the curved outer area.

Figure 12:
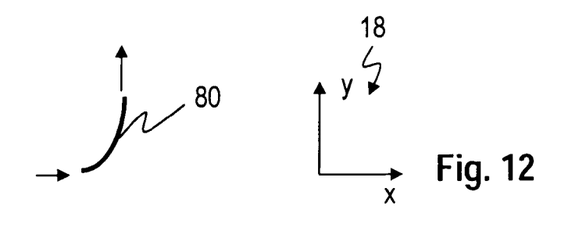

In other embodiments it is not necessary that the curved area of the light guide, in the example the curved outer area of the light guide 80, has the form of a sector of a circular cylinder. Rather, curvatures like in FIG. 12, in particular elliptic, parabolic or other curve shapes in the plane of curvature are conceivable. All other properties of the light guide can be for example the same as those in the first embodiment.

Figures 13, 14:
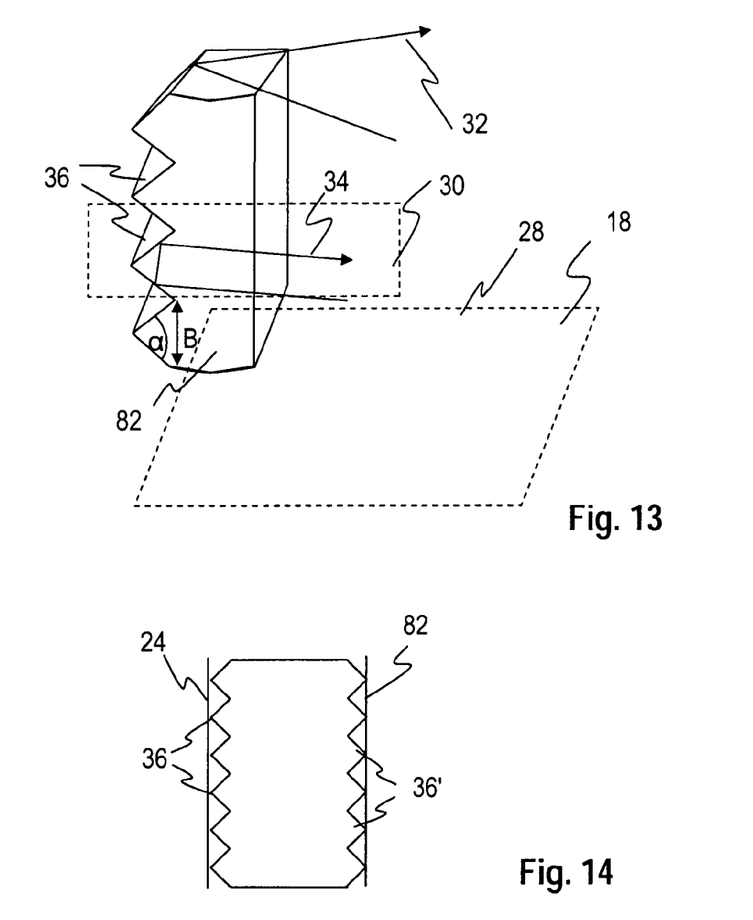

A further embodiment of an illumination or image capturing device differs from the illumination or image capturing device in FIG. 8 and FIG. 9 through the configuration of the entrance and/or exit areas. As schematically shown in FIG. 13, these can be curved, so that in the first plane of incidence they have a magnifying, demagnifying or imaging effect. In FIG. 13, the entrance area 82 has a circular cylindrical form and can serve, like a cylindrical lens, for magnifying or demagnifying the object or detector in the x direction and for magnifying the back focal distance. With respect to the other properties, the light guide is configured like in the first embodiment, so that the same parts have the same reference signs.

A further variant of an apparatus having a light guide differs from the preceding embodiments only in that the light guide has an anisotropically retroreflective retroreflector portion 36' also on a curved inner area 84 opposing the curved outer area 24, which retroreflector portion has the same first plane of incidence and preferably is configured like the outside retroreflector portion 36. Preferably it has the same prism structure. This makes it possible that upon more strongly divergent ray bundles still further proportions are concentrated.

Figure 15:
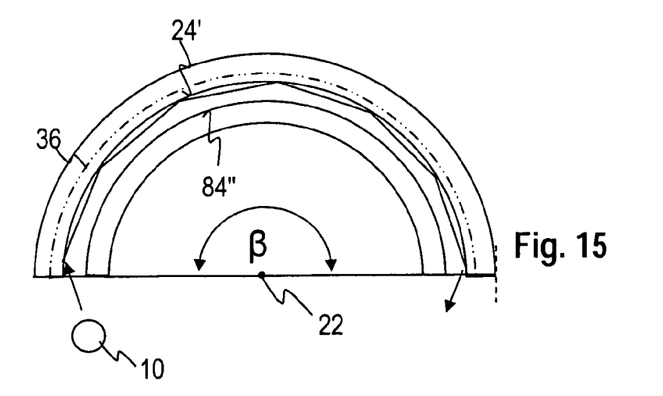

Further variants of the preceding embodiments differ from these in that the optical radiation is guided outside the light guide, i.e. at the convex side 24' of the inner area of a curved plate, which itself can represent a light guide, for the purpose of which the surface of the retroreflector portion can be mirror-coated along the curved area 24'. This is schematically illustrated in FIG. 15, whereby the dashed line illustrates, as in FIG. 1, the retroreflector structure. In this way, by adding an inner area 84" applied onto a further carrier, there can be formed a hollow cavity light guide, or a massive light guide can be combined with a hollow cavity light guide.

The invention claimed is:

1. An apparatus for the analysis of an object using optical radiation, comprising;
   a light guide including an anisotropic retroreflector portion formed along an area curved in a plane of curvature, said retroreflector portion specularly reflecting radiation components in a first plane of incidence parallel to the plane of curvature, but retroreflecting radiation components orthogonal to the first plane of incidence, so that at least a proportion of the optical radiation grazingly falling on the retroreflector portion is at least partly guided at the convex side of the area by reflection at the retroreflector portion, and
   a receiving device configured to capture the optical radiation guided at the convex side of the area curved in the plane of curvature.

2. The apparatus according to claim 1, wherein the curved area has the form of a sector of a circular cylinder.

3. The apparatus according to claim 1, wherein the curved area has a radius of curvature in the first plane of incidence between 10 mm and 100 mm.

4. The apparatus according to claim 1, wherein the light guide has the form of a plate curved in the plane of curvature, preferably of constant thickness.

5. The apparatus according to claim 1, wherein the light guide has a further anisotropic retroreflector portion which is formed along a further area curved in the plane of curvature and which specularly reflects radiation components in a first plane of incidence parallel to the plane of curvature orthogonal to the axis, but retroreflects radiation components orthogonal to the first plane of incidence, so that optical radiation coupled-in the light guide is guided along an S-shaped area.

6. The apparatus according to claim 1, wherein the light guide is configured to be reflective for the optical radiation along an inner area which opposes the curved area and is located on the convex side of the curved area.

7. The apparatus according to claim 1, wherein the light guide has an inner anisotropic retroreflector portion along an inner area which opposes the curved area and is located on the convex side of the curved area, which retroreflector portion specularly reflects radiation components in a first plane of incidence parallel to the plane of curvature, but retroreflects radiation components orthogonal to the first plane of incidence, so that the optical radiation is guidable at least partly between the retroreflector portions.

8. The apparatus according to claim 1, wherein the receiving device for capturing the guided optical radiation in locally resolved fashion is formed along at least one line.

9. An optical sensor for capturing optical properties of an object in a specified capture region comprising the apparatus recited in claim 1, wherein optical radiation coming from the capture region is guided at the retroreflector portion.

10. The optical sensor according to claim 9, which comprises, for the illumination of the capture region, a source that emits the optical radiation in a specified spectral range, said optical radiation at least partly grazingly falling on the retroreflector portion and being guided thereby, in which the optical radiation guided by the retroreflector portion of the apparatus for illumination illuminates the capture region.

11. The apparatus according to claim 1, wherein the light guide has an entrance area enabling the optical radiation to be coupled into the light guide, so that this optical radiation is guided at least partly in the light guide at the convex side of the area by reflection at the retroreflector portion, and has an exit area through which optical radiation coupled into the light guide through the entrance area and guided therein exits from the light guide.

12. The apparatus according to claim 11, wherein the entrance or exit areas are planar areas, and are inclined orthogonally to the plane of curvature and in a specified angle relative to the second plane of incidence at the entrance and/or exit area.

13. The apparatus according to claim 11, wherein the entrance or exit areas are formed in bulged fashion such that they act as lenses.

14. The apparatus according to claim 1, further comprising a source that emits the optical radiation in a specified spectral range, said optical radiation at least partly grazingly falling on the retroreflector portion and being guided thereby.

15. An apparatus for the analysis of an object using optical radiation, comprising;
a light guide including an anisotropic retroreflector portion formed along an area curved in a plane of curvature,
said retroreflector portion specularly reflecting radiation components in a first plane of incidence parallel to the plane of curvature, but retroreflecting radiation components orthogonal to the first plane of incidence, so that at least a proportion of the optical radiation grazingly falling on the retroreflector portion is at least partly guided at the convex side of the area by reflection at the retroreflector portion,
wherein the light guide has an entrance area enabling the optical radiation to be coupled into the light guide, so that this optical radiation is guided at least partly in the light guide at the convex side of the area by reflection at the retroreflector portion, and has an exit area through which optical radiation coupled into the light guide through the entrance area and guided therein exits from the light guide.

16. The apparatus according to claim 15, wherein the entrance and/or exit areas are planar areas, and are inclined orthogonally to the plane of curvature and in a specified angle relative to the second plane of incidence at the entrance and/or exit area.

17. The apparatus according to claim 15, wherein the entrance and/or exit areas are formed in bulged fashion such that they act as lenses.

18. An apparatus for the analysis of an object using optical radiation, comprising;
a light guide including an anisotropic retroreflector portion formed along an area curved in a plane of curvature, said retroreflector portion specularly reflecting radiation components in a first plane of incidence parallel to the plane of curvature, but retroreflecting radiation components orthogonal to the first plane of incidence, so that at least a proportion of the optical radiation grazingly falling on the retroreflector portion is at least partly guided at the convex side of the area by reflection at the retroreflector portion, and a source that emits the optical radiation in a specified spectral range, said optical radiation at least partly grazingly falling on the retroreflector portion and being guided thereby.

19. The apparatus according to claim 18, wherein the entrance and/or exit areas are planar areas, and are inclined orthogonally to the plane of curvature and in a specified angle relative to the second plane of incidence at the entrance and/or exit area; wherein the source is configured to emit the optical radiation in a ray bundle with a strip-shaped cross section at the entrance area, and wherein a longitudinal direction of the cross section extends orthogonally to the first plane of incidence.

20. An optical sensor for capturing optical properties of an object in a specified capture region comprising the apparatus recited in claim 18, whose optical radiation guided by the retroreflector portion illuminates the capture region, and a receiving device which is configured to capture optical radiation from the capture region and forming signals describing the properties of the captured radiation.

* * * * *